US006744918B1

(12) United States Patent
Caldato et al.

(10) Patent No.: US 6,744,918 B1
(45) Date of Patent: Jun. 1, 2004

(54) DOCUMENT ANALYSIS METHOD TO DETECT BW/COLOR AREAS AND CORRESPONDING SCANNING DEVICE

(75) Inventors: Claudio Caldato, Bergamo (IT); Andrea Monaci, Bergamo (IT); Douglas Heins, Burley, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/395,902

(22) Filed: Sep. 14, 1999

(30) Foreign Application Priority Data

Sep. 22, 1998 (EP) .............................. 98203196

(51) Int. Cl.[7] .................................. G06K 9/00
(52) U.S. Cl. ................. 382/164; 382/172; 382/176; 382/166; 382/167; 382/237; 382/299
(58) Field of Search .................. 382/172, 173, 382/176, 162, 164, 166, 167, 180, 270, 237, 251, 299

(56) References Cited

U.S. PATENT DOCUMENTS

| 5,243,447 A | | 9/1993 | Bodenkamp et al. |
| 5,383,037 A | * | 1/1995 | Kimura et al. ............. 358/520 |
| 5,414,781 A | * | 5/1995 | Spitz et al. ................ 382/317 |
| 5,502,642 A | | 3/1996 | Dichter |
| 5,530,798 A | | 6/1996 | Chu et al. |
| 5,629,780 A | * | 5/1997 | Watson ...................... 382/250 |
| 5,649,193 A | * | 7/1997 | Sumita et al. ............. 707/101 |
| 5,778,092 A | * | 7/1998 | MacLeod et al. .......... 382/176 |
| 6,118,895 A | * | 9/2000 | Hirota et al. ................ 358/52 |
| 6,295,385 B1 | * | 9/2001 | Takaoka et al. ........... 382/296 |

OTHER PUBLICATIONS

European Search Report for EP98203197 dated Mar. 5, 1999 by Examiner Gonzalez Ordonez, O.

* cited by examiner

Primary Examiner—Bhavesh M. Mehta
Assistant Examiner—Ali Bayat

(57) ABSTRACT

The invention relates to a document analysis method to detect BW/color areas comprising the following steps: getting an input image data to be split in elementary information; analysing the input data to get the colorfulness of each elementary information; creating a first and a second output layers corresponding to the BW and color elementary information respectively; applying a first set of atomic operations to the BW layer and a second different set of atomic operations to the color layer; and combining the BW and color layers in order to obtain a desired format for the output data. The invention also relates to a scanning device to acquire documents including an input that receives an input image data, and is connected to a layer creator component, which in turn outputs a first and a second layer, such layers having different data compression rate. Finally, the invention relates to a method for acquiring a document based on the analysis of the content of the document itself.

14 Claims, 10 Drawing Sheets

300dpi 24bpp = 26 MByte   BIP Smart Compression = 94 KByte

300dpi 1bpp G4 compressed     150dpi 24bpp JPEG compressed

INPUT DATA          TEXT                    IMAGE

DOCUMENT ANALYSIS METHOD TO DETECT BW/COLOR AREAS AND CORRESPONDING SCANNING DEVICE

FIELD OF THE INVENTION

The present invention relates to a document analysis method and, more particularly, to a document analysis method to detect BW/color areas.

Moreover, the invention relates to a scanning device to acquire documents.

Finally, the invention relates to a method for acquiring a document based on the analysis of the content of the document itself.

BACKGROUND OF THE INVENTION

As is well known in the technical field of image processing, during its life an image is processed by a plurality of electronic devices, that create, acquire, display store, read and write the image itself.

The image data processing device, and the corresponding processing method deal with an image acquired by means of an image acquisition device, for example a scanner.

The image data so obtained are usually organized into a raster of pixels, each pixels providing an elementary image information.

In other words, images are, at the most basic level, arrays of digital values, where a value is a collection of numbers describing the attributes of a pixel in the image. For example, in bitmaps, the above mentioned values are single binary digits.

Often, these numbers are fixed-point representation of a range of real number; for example, the integers 0 through 255 are often used to represent the numbers from 0.0 to 1.0. Often too, these numbers represent the intensity at a point of the image (gray scale) or the intensity of one color component at that point.

An important distinction has to be made in the images to be processed between achromatic and colored images.

In fact, achromatic light has only one attribute, which is the quantity of light. This attribute can be discussed in the physic sense of energy, in which case the terms intensity and luminance are used, or in the psychological sense of perceived intensity, in which case the term brightness is used.

It is useful to associate a scale with different intensity levels, for instance defining 0 as black and 1 as white; intensity levels between 0 and 1 represent different levels of grays.

The visual sensations caused by colored light are much more richer than those caused by achromatic light. Discussion on color perception usually involves three quantities, known as hue, saturation and lightness.

1. Hue distinguishes among colors such as red, green, purple and yellow.

2. Saturation refers to how far a color is from a gray of equal intensity. Red is highly saturated; pink is relatively unsaturated; royal blue is highly saturated; sky blue is relatively unsaturated. Pastel colors are relatively unsaturated; unsaturated colors include more white light than do the vivid, saturated colors.

3. Lightness embodies the achromatic notion of perceived intensity of a reflecting object.

A fourth term, brightness, is used instead of lightness to refer to the perceived intensity of a self-luminous object (i.e. an object emitting rather than reflecting light), such as a light bulb, the sun or a CRT.

The above mentioned features of colors seem to be subjective: they depend on human observers' judgment. In reality, the branch of physics known as colorimetry provides for an objective and quantitative way of specifying colors, which can be correlated to the above perceptual classification.

A color can be represented by means of its dominant wavelength, which corresponds to the perceptual notion of hue; excitation purity corresponds to the saturation of the color; luminance is the amount or intensity of light. The excitation purity of a colored light is the proportion of pure light of the dominant wavelength and of white light needed to define the color.

A completely pure color is 100% saturated and thus contains no white light, whereas mixtures of a pure color and white light have saturations somewhere between 0 and 100%. White light and hence gray are 0% saturated, contains no color of any dominant wavelength.

Furthermore, light is fundamentally electromagnetic energy in the 400–700 nm wavelength part of the spectrum, which is perceived as the colors from violet through indigo, blue, green, yellow and orange to red. The amount of energy present at each wavelength is represented by a spectral energy distribution P(I), as shown in FIG. 1.

The visual effect of any spectral distribution can be described by means of three values, i.e. the dominant wavelength, the excitation purity, and the luminance. FIG. 2 shows the spectral distribution of FIG. 1, illustrating such three value. In particular, it should be noted that at the dominant wavelength there is a spike of energy of level e2. White light, the uniform distribution of energy level e1 is also present.

The excitation purity depends on the relation between e1 and e2: when e1=e2, excitation purity is 0%; when e1=0, excitation purity is 100%.

Luminance, which is proportional to the integral of the area under such curve, depends on both e1 and e2.

A color model is a specification of a 3D color coordinate system and a visible subset in the coordinate system within which all colors in a particular range lie. For instance, the RGB (red, green, blue) color model is the unit cube subset of a 3D Cartesian coordinate system, as shown in FIG. 3.

More specifically, three hardware-oriented color models are RGB, used with color CRT monitors, YIQ, i.e. the broadcast TV color system that is a re-coding of RGB transmission efficiency and for downward compatibility with black and white television and CMY (cyan, magenta, yellow) for some color-printing devices. Unfortunately none of these models are particularly easy to use because they do not relate directly to intuitive color notions of hue, saturation, and brightness. Therefore, another class of models has been developed with ease of use as a goal, such as the HSV (hue, saturation, value)—sometimes called HSB (hue, saturation, brightness) HLS (hue, lightness, saturation) and HVC (hue, value, chroma) models.

With each model is also given a means of converting to some other specification.

As stated above, the RGB color model used in color CRT monitors and color raster graphics employs a Cartesian coordinate system. The RGB primaries are additive primaries; that is the individual contributions of each primary are added together to yield the result. The main diagonal of the cube, with equal amounts of each primary, represents the gray levels: black is (0,0,0); white is (1,1,1).

Following such gray line implies the change of the three Cartesian value R, G and B at the same time, as shown with a point-dotted line in FIG. 4A; this situation weights the computational charge of the image processing steps requiring the individuation of gray regions.

The RGB model is hardware-oriented. By contrast HSV (as well as HSB or HLC) model is user-oriented, being based on the intuitive appeal of the artist's tint, shade, and tone. The coordinate system is cylindrical, as shown in FIG. 4B.

The HSV model (like the HLC model) is easy to use. The grays all have S=0 and they can be removed from an image data raster by means of a cylindrical filter in proximity of the V axes, as shown in FIG. 5; moreover, the maximally saturated hues are at S=1, L=0.5.

The HLS color model is a reduced model obtained from the HSV cylindrical model, as shown in FIG. 6; the reduction of the color space is due to the fact that some colors cannot be saturated. Such space subset is defined is a hexcone or six-sided pyramid, as shown in FIG. 7. The top of the hexcone corresponds to V=1 which contains the relatively bright colors. The colors of the V=1 plane are not all of the same perceived brightness however.

Hue or H, is measured by the angle around the vertical axis with red at 0° green at 120° and so on (see FIG. 7), Complementary colors in the HSV hexcone are 180° opposite one another. The value of S is a ratio ranging from 0 on the center line (V axis) to 1 on the triangular sides of the hexcone.

The hexcone is one unit high in V, with the apex at the origin. The point at the apex is black and has a V coordinate of 0. At this point, the values of H and S are irrelevant. The point S=0, V=1 is white. Intermediate values of V or S=0 (on the center line) are the grays. It is therefore immediately apparent the simplicity of use of the HSV or equivalent color space in order to obtain the gray regions.

Adding a white pigment corresponds to decreasing S (without changing V). Shades are created by keeping S=1 and decreasing V. Tones are created by decreasing both S and V. Of course, changing H corresponds to selecting the pure pigment with which to start. Thus, H, S, and V correspond to concepts from the perceptive color system.

The top of the HSV hexcone corresponds to the projection seen by looking along the principal diagonal of the RGB color cube from white toward black, as shown in FIG. 8.

In FIG. 9 is shown the HLS color model, which is defined in a double-hexcone subset of the cylindrical space. Hue is the angle around the vertical axis of the double hexcone, with red at 0°. The colors occur around the perimeter: red, yellow, green, cyan, blue and magenta. The HLS space can be considerated as a deformation of HSV space, in which white is pulled upward to form the upper hexcone from the V=1 plane. As with the single-hexcone model, the complement of any hue is located 180° farther around the double hexcone, and saturation is measured radially from the vertical axis form 0 on the axis to 1 on the surface. Lightness is 0 for black (at the lower tip of the double hexcone) to 1 for white (at the upper tip).

Many hardware and software packages are currently available in the technical field of the electronic image processing which provide for image data processing methods and corresponding devices. However, it should be noted that only few, if any, operate in both the personal computer/work station field as well as in the embedded devices field.

In fact, the embedded devices have a plurality of needs which turn into tight limitations for the image processing devices themselves. Particularly, the image processing in an embedded environment seeks:

- to reduce the size of the image data in order to limit the memory area employed by the image data processing devices;
- to increase the amount of any text portion comprised in a document that can be OCR'able, i.e. it should be possible to acquire and understand such portion by means of an Optical Characters Recognitor (OCR);
- to get as final result of the image data processing device an image viewable and printable, which is close to the original acquired image.

Known document analysis that tried to fit the above requirements have the problem of being computationally very heavy and not suited for embedded applications where processing power and memory requirements are stringent and important.

So, even if these solutions may perform an acceptable analysis of the document, they are not applicable in an embedded environment.

The main purpose of the known document analysis is the extraction of features and the classification of text and images in the analyzed documents. Examples of analysis used in this technical field are known from the publication "Document Image Analysis" to L. O'Gorman and R. Kasturi, IEEE Computer Society Press, which is a collection of all the most relevant papers regarding document analysis.

All the known approaches deal with the recognition of different types of areas on a page. The areas are normally classified into regions of text, photo and line art. The page is then divided into these different areas (normally in a mutually exclusive way) and each is treated in a different way. In other terms, the known document analysis deal with understanding the "type" of information that is on the page.

These solutions tend to sub-divide the page into mutually exclusive regions that contain different type of information.

Other known devices deal with decomposed documents, i.e. documents translated into a plurality of elementary image information called pixels. Such devices provide a treatment of the decomposed document as a whole, or at least are able to reconstruct the information they need only reprocessing the input document format.

An illustrative and not limiting example is a BW fax machine. If such device can deal only with BW data and the document contains a mixture of sparse color and BW data, the fax machine image processing device must be able to reconstruct a single BW page from the pieces of the decomposed original document.

A known way to comply with the embedded environment requirements leads to peripheral devices that support only the specified features of a particular product; that is how cost and performance are satisfied.

However, none of the known solutions deals with the problem of maintaining the original appearance of the document, and therefore no accent is posed on the recognition of the color itself on the document and what can be done once this color content is known.

One object of the present invention is that of providing a dual path distinction method for two different layers, i.e. the BW and color layer, identifying the features used to classify as colorful or not a certain group of pixel of a raster image.

The reason for doing this can be explained in the following way. As an example, in a document as a magazine article, there are areas of color, for example photographs and colored text and highlighted areas which include bright colors and which a user would like to retain as colors. There are also areas, typically backgrounds areas which are either very light or dark, that even if one could argue that they have a color content, can be equally be well represented with only two colors, i.e. black and white.

Moreover, the color information content of background area, even if not negligible, could be of no interest with respect to the BW content. This is the case of the so-called "business text": the information content of the image data is superimposed to a color background content which can be ignored, without loosing any useful information.

After the separation between these areas, the data in each area could be processed differently: color data could be compressed in a lossy fashion, whereas the BW data could be binarized, and the user would not see a big difference in the quality of the document.

SUMMARY OF THE INVENTION

The solution idea behind this invention is that of providing a dual path distinction method which could create a BW and a color layer starting from a single input data sheet.

According to this solution idea, the invention relates to a document analysis method using BW/color areas detection as defined in the enclosed claim 1.

Moreover, the invention relates to a scanning device, as defined in the enclosed claim 9.

Finally, the invention relates to a method for acquiring a document based on the analysis of the content of the document itself, as defined in the enclosed claim 15.

The features and advantages of the BW/color document analysis method and layers creator device according to the invention will be appreciated by the following description of a preferred embodiment given by way of non-limiting examples with reference to the annexed drawings.

DETAILED DESCRIPTION OF THE INVENTION

The basic idea underlying present application is that of processing a document in order to provide distinct BW and color layers. Starting from a color page acquired with a scanner capable to deliver color data, the first step is to understand where there is a color on the color page. For this purpose such method uses colorfulness and region groupings for document analysis.

In particular, the document analysis method according to the present invention comprises the following steps:

1. Getting a color image input data, for example a pixels raster format.
2. Calculating and extracting from the input data the colorfulness of each pixel.
3. Creating a first and a second output layers corresponding to the BW and color pixels respectively.
4. Applying a first set of atomic operations to the BW layer and a second different set of atomic operations to the color layer.
5. Combining the BW and color layers in order to obtain a desired format for the output data.

The purpose of such document analysis method is that of distinguish between text and image; so, the method according to the present invention comprises a first path BW PATH that detects the BW pixels in order to assemble a first layer TEXT containing the portion of text comprised in the input data and a second path COLOR PATH that detects the color pixels in order to assemble a second layer IMAGE containing the portion of image comprised in the input data.

Figure 1:
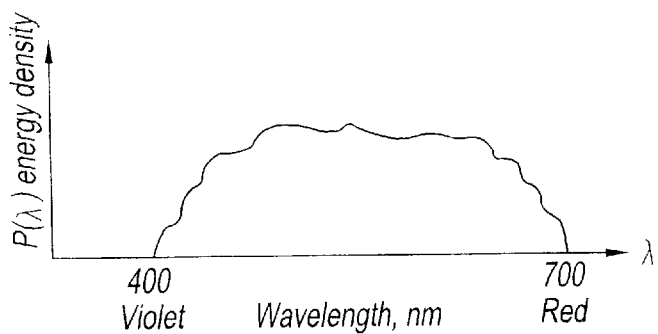
FIG. 1 shows an example of a spectral energy distribution of a color.
Figure 2:
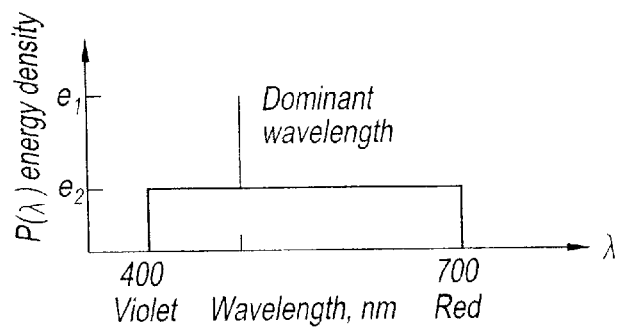
FIG. 2 shows the spectral distribution of FIG. 1, illustrating dominant wavelength, excitation purity and luminance.
Figure 3:
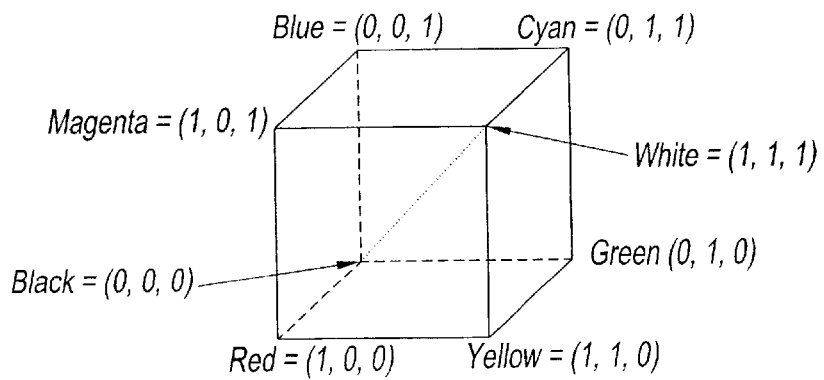
FIG. 3 shows the 3D Cartesian representation of the RGB color space, with the fundamental colors.
Figure 4A:
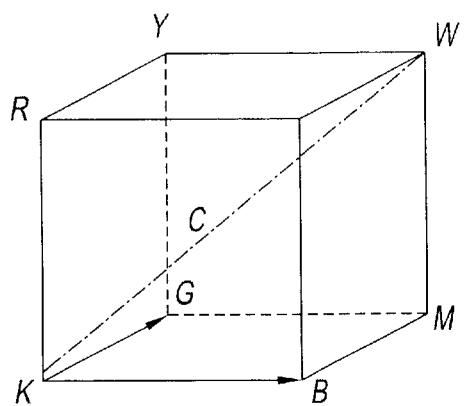
FIG. 4A shows the RGB color space of FIG. 3 and the gray line within.
Figure 4B:
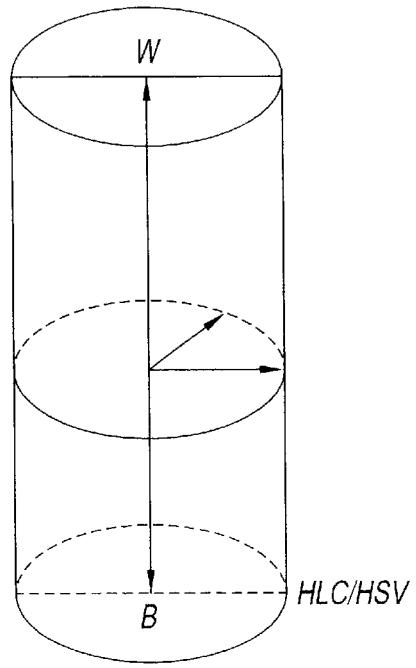
FIG. 4B shows the cylindrical representation of the HSV/HLC color space.
Figure 5:
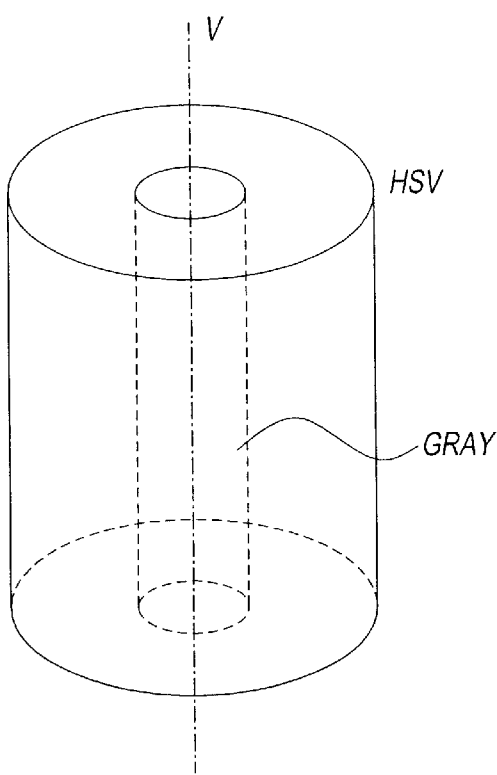
FIG. 5 shows a gray filter for the HSV/HLC color space.
Figure 6:
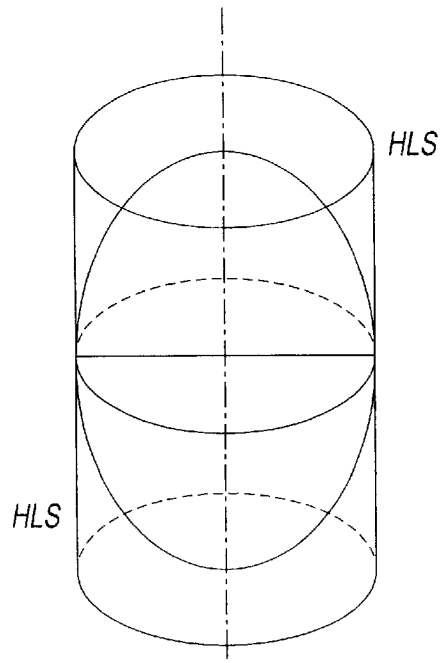
FIG. 6 shows the HLS color space.
Figure 7:
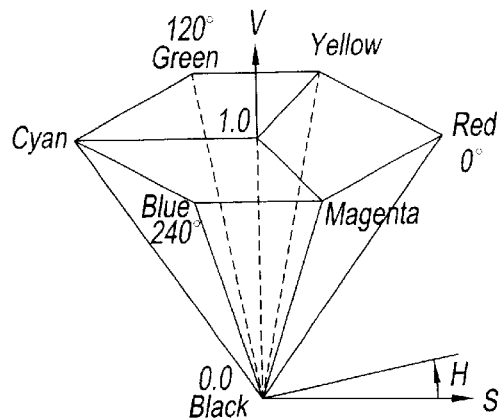
FIG. 7 shows the single-hexcone representation of HSV color space.
Figure 8:
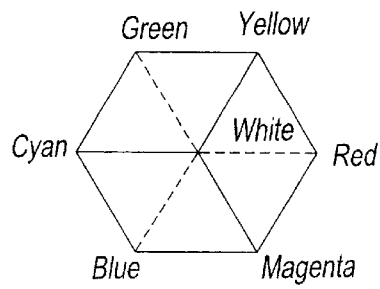
FIG. 8 shows a section of FIG. 7.
Figure 9:
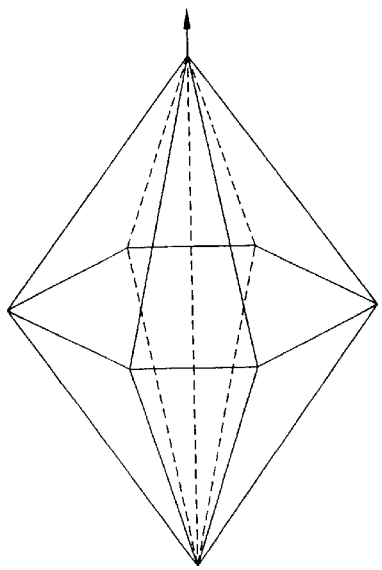
FIG. 9 shows the double-hexcone representation of the HSV color space.
Figure 10:
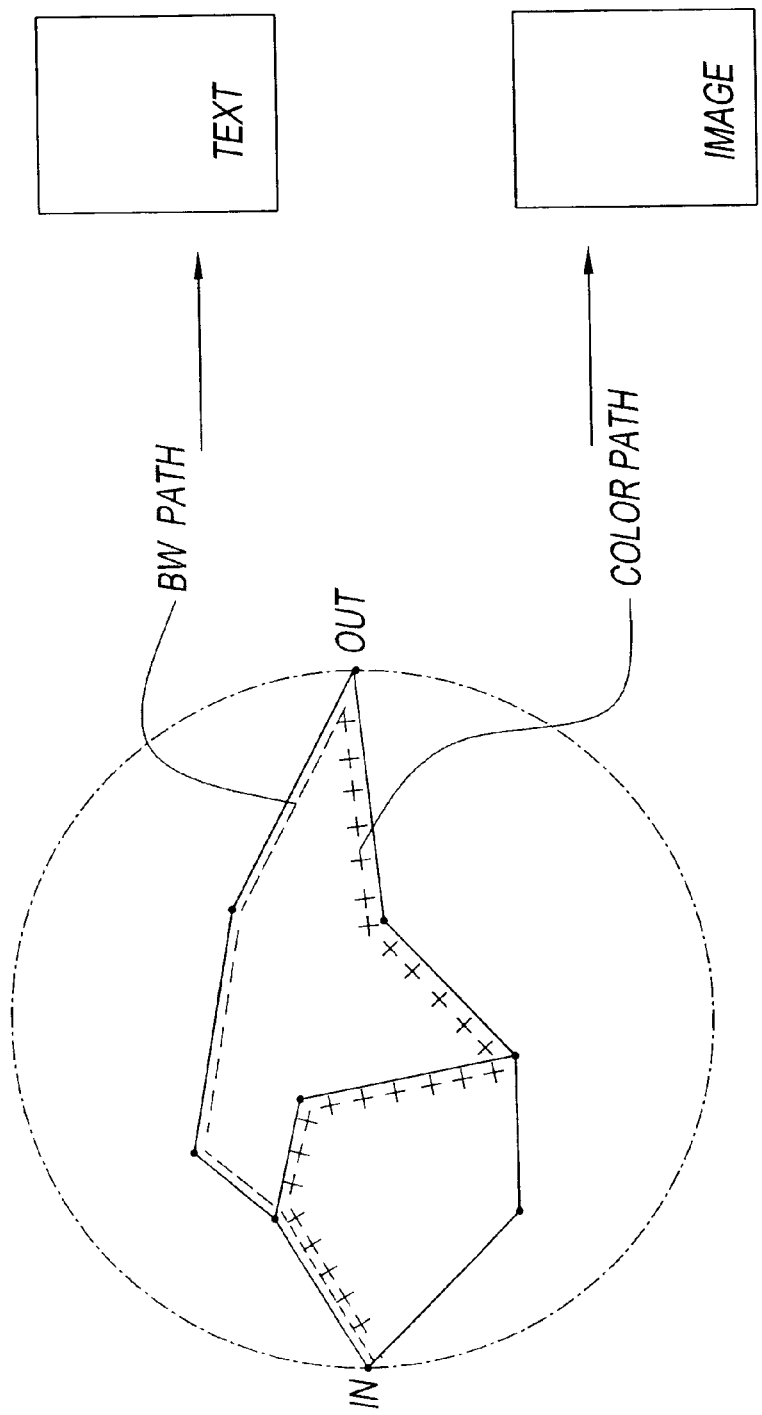
FIG. 10 shows schematically a document analysis method according to the present invention.

In FIG. 10, the method according to the present invention is shown in terms of pipelines, i.e. in term of "paths" of atomic operations to be performed on the input data in order to obtain a particular output format. More particularly, FIG. 10 shows the two different output representation, TEXT and IMAGE, obtained by means of said first and second data paths, BW PATH and COLOR PATH respectively.

The pipelines or paths define the sequence of atomic operations to be performed on the input image data. Such atomic operations, which are individually known in the field of image data processing, can be grouped together to generate a plurality of IP (Image Processing) tools.

In order to obtain the BW/color layer distinction according to the above method, may be used the following IP tools:

a transformation of an image pixel from the RGB format to another image space format, for example the HLS (or HLN, for hue, lightness, chroma indicator N) format;
  a grouping function that associates elementary information in order to obtain an unique information group to be processed, as the blobbing technique;
  a down sampling function;
  a thresholding function;
  an AND/OR and other data extraction function;
  compression functions (in particular, the G4 or JPEG compression method).

Figure 11A:
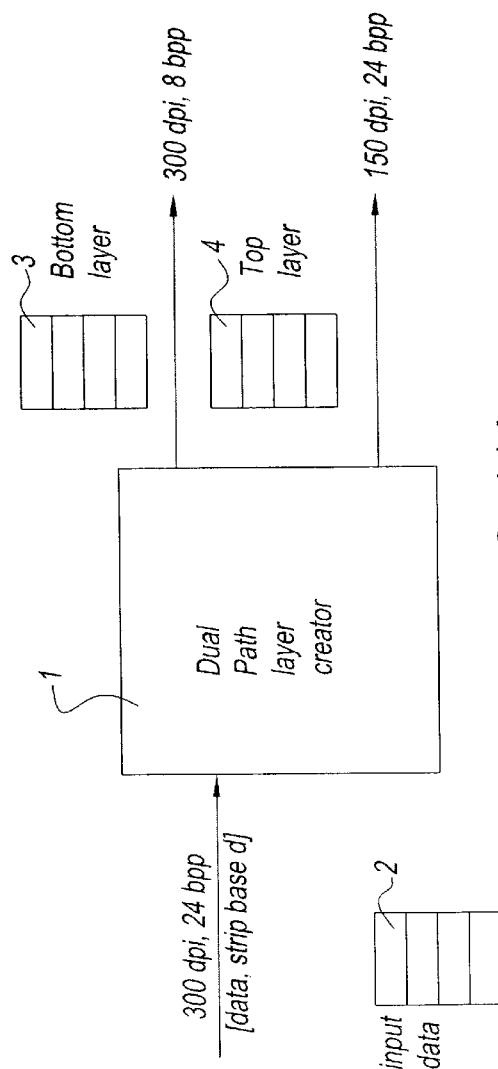
FIG. 11A shows schematically a dual path layer creator implementing such method according to the present invention.

FIG. 11A shows a dual path layer creator 1, receiving an input data 2 and outputting a first 3 and a second layer 4 of organized output data.

The input data 2 are in some color format, for e.g., but is not limited to, the RGB format, and they are organized under the form of color pixels raster. It is possible obtaining such data format by means, for example, of a scanner.

As an example, from a 300 dpi 24 bpp (bit per pixels) color input image, the dual path layer creator 1 outputs a 300 dpi 8 bpp [bottom layer] representation of the input data, as well as a 150 pdi 24 bpp color representation [top layer]. The effect of this is that instead of having to process the 300 dpi, 24 bpp data of 24 Mbyte, only 300 dpi 8 bpp=8 Mbyte and 150 dpi, 24 bpp=6 Mbyte of data have to be processed, the sum of 14 Mbyte being much less than the original 24 Mbyte.

Advantageously, according to the present invention, the dual path layer creator 1 produces the two document layers 3 and 4 simultaneously.

Figure 12:
FIG. 12 shows resulting layers from the dual path layer creator of FIG. 11A.
Figure 12:
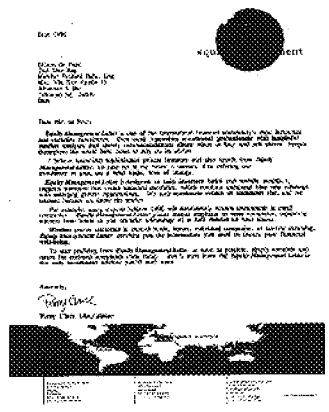
Figure 12:

Particularly, such layers 3 and 4 have a different resolution, as shown in FIG. 12. As an example, a resolution of 150 dpi is used when the color information of the image input data is needed, e.g. in case of a graphic representation of the output data (color format). Moreover, a resolution of 300 dpi is needed for the OCR'ble portion text of the image (BW format).

It should be noted that the sum of the sizes of the color layer at 150 dpi plus the BW layer at 300 dpi is lower than the size of the color layer at 300 dpi.

In this aim, according to the present invention, a method for acquiring a document based on the analysis of the content of the document itself, comprises the following steps:
   getting an input image data;
   creating a first layer containing the image information in a color format;
   creating a second layer containing the image information in a BW format;
   managing the first and the second layers in order to obtain a desired format for an output document.

Figure 11B:
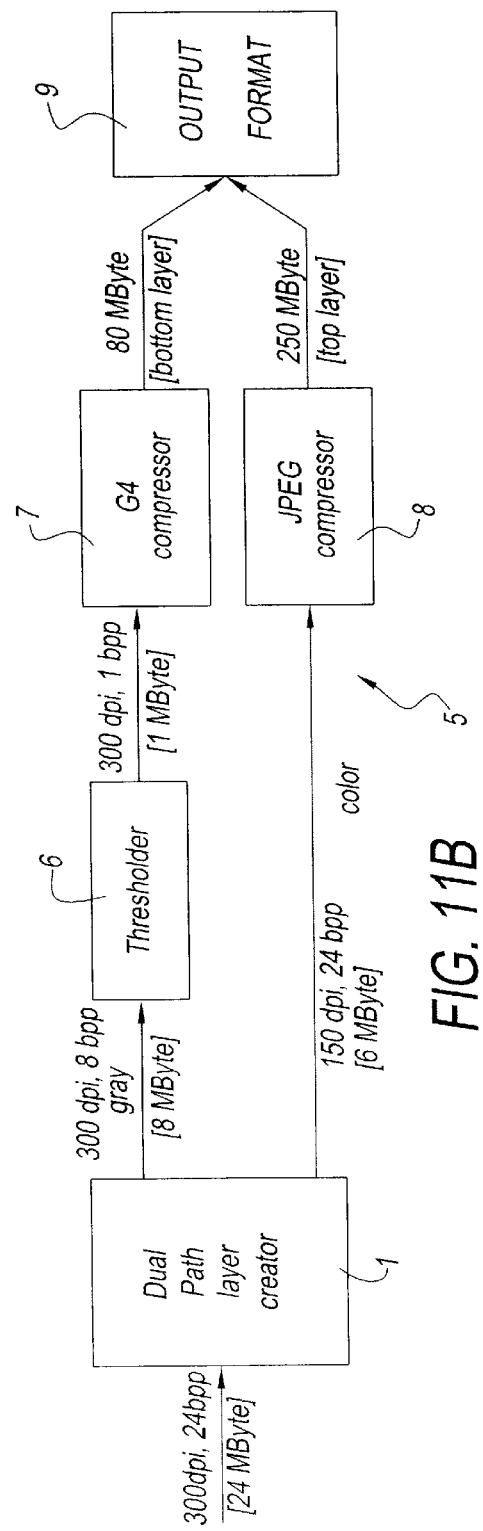
FIG. 11B shows more particularly the dual path layer creator of FIG. 11A.

In order to further reduce the memory area requirements, a dual path processing line 5 for the BW and color layers obtained by the dual path layer creator 1 is shown schematically in FIG. 11B.

The dual path processing line 5 comprises the dual path layer creator 1 receiving an input data 2 and outputting the first 3 and the second output data layer 4.

The first output data layer 3 is then processed by means of a series of a thresholder 6 and a G4 compressor 7, while the second output data layer 4 is only compressed by means of a JPEG compressor 8. The output data layer so processed are then forwarded to an output reconstruct block 9, that provide the required output format.

As an example, from the 300 dpi 8 bpp and the 150 pdi 24 bpp representations obtained from the dual path layer creator 1, the thresholder 6 produces a 300 dpi 1 bpp representation and the G4 compressor 7 a 80 kByte bottom layer, while the JPEG compressor 8 produces a 250 kByte top layer. The effect is this of having to process only 80+250=330 kByte of output data, instead of the 24 MByte of input data.

As an example, creating color and BW layers, as previously suggested, decreases the memory area requirements. Moreover, elaborating layers having reduced sizes increases the elaboration speed, so enhancing the processing line's performance as a whole.

FIG. 12 shows the resulting compressed layers (TEXT and IMAGE) from the dual path layer creator 1 of FIG. 11A.

More particularly, in order to distinguish regions on a page that are colorful from regions that are not such, a BW/color areas detection document analysis method according to the above indication comprises the following steps:
   1. Analysing the input data in a Chroma space format.
   2. Calculating and extracting from the input data the colorfulness of each pixel.
   3. Down sampling Chroma indication channel.
   4. Applying a threshold to the down sampled data.
   5. Label ON the pixels having a colorfulness above the threshold and OFF the pixels having a colorfulness lower than the threshold.

According to the present invention, the BW/color areas detection document analysis method should be improved adding the further step of:
   6. Grouping the color information of single small groups of pixels, improving the compression of the document and enabling the elimination of small groups of pixels that are still considered to be due to noise, or in any case, of insignificant size.

Figure 13A:
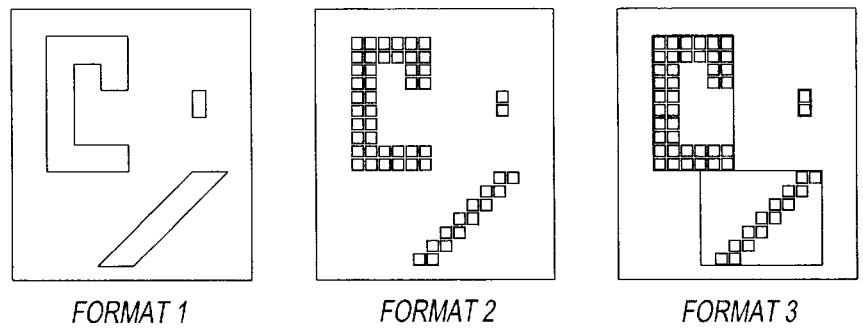
FIGS. 13A, 13B and 13C show a first atomic operation used in the method according to the present invention and its implementation.

As shown in FIG. 13A, the BW/color areas detection document analysis method comprises a down sampling and a thresholding step. Once the colorfulness of each pixel has been calculated and extracted from the input data (FORMAT 1), the image data are down sampled.

The down sampling algorithm can be performed in various ways that all have a different effect on the performance of the algorithm. If down sampling by taking the average value in a neighborhood is used, a lot of document (small regions of color due to the printing process for e.g.) and scanner noise (jitter on the RGB signal) can be eliminated.

The down sampled image data are then selected by means of a threshold, so obtaining an image having a pixels format without the spike noise (FORMAT 2). In fact, the output data are considered ON if colorfulness of the input image pixel is above the threshold and OFF if it is lower than the threshold.

The simplest case consists in applying a fixed threshold. The output of this stage is a down sampled version of the original image that has ON pixels in those regions where the color content of the original image were above the color threshold.

Different threshold values can be considered with reference to different final devices.

For example, a low resolution display does not need to receive a 16 billion color image data, since such device have no possibility of elaborating and displaying this kind of complex image data. An image data forwarded to a low resolution display can be obtained by means of particular thresholding values by limiting the number of available colors, e.g. filtering pale colors and transforming then into white or "clustering" different type of "reds" in order to have only one "red".

An example of an acceptable range for the threshold values is 0 to 30 for an input image data of 0 to 255.

The more complex case accumulates a histogram of the color content of the page and, using a heuristic, decides what the best threshold for the page is.

The color information of single small groups of pixels can be further grouped together using known simple grouping techniques. The grouping step is performed on data of connected components, as shown in FIG. 13A (FORMAT 3). This has the advantage of grouping regions of pixels that are considered colorful into bigger group. In this way, when the regions of colorful pixels are compressed (in a later stage), not every pixel has to be compressed singularly. The compression of a larger group of pixels is more efficient than the singular compression of each single colorful region.

The grouping of pixels also has the advantage of enabling the elimination of small groups of pixels that are still considered to be due to noise, or in any case, of insignificant size.

Figure 13B:
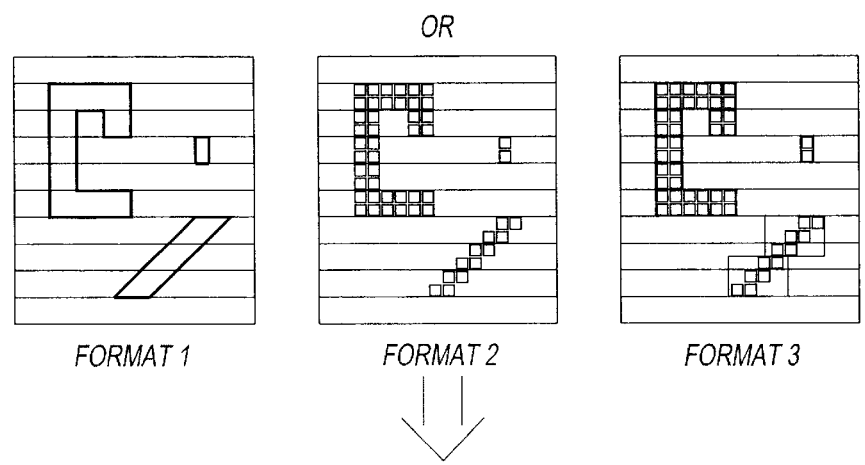
Figure 14:
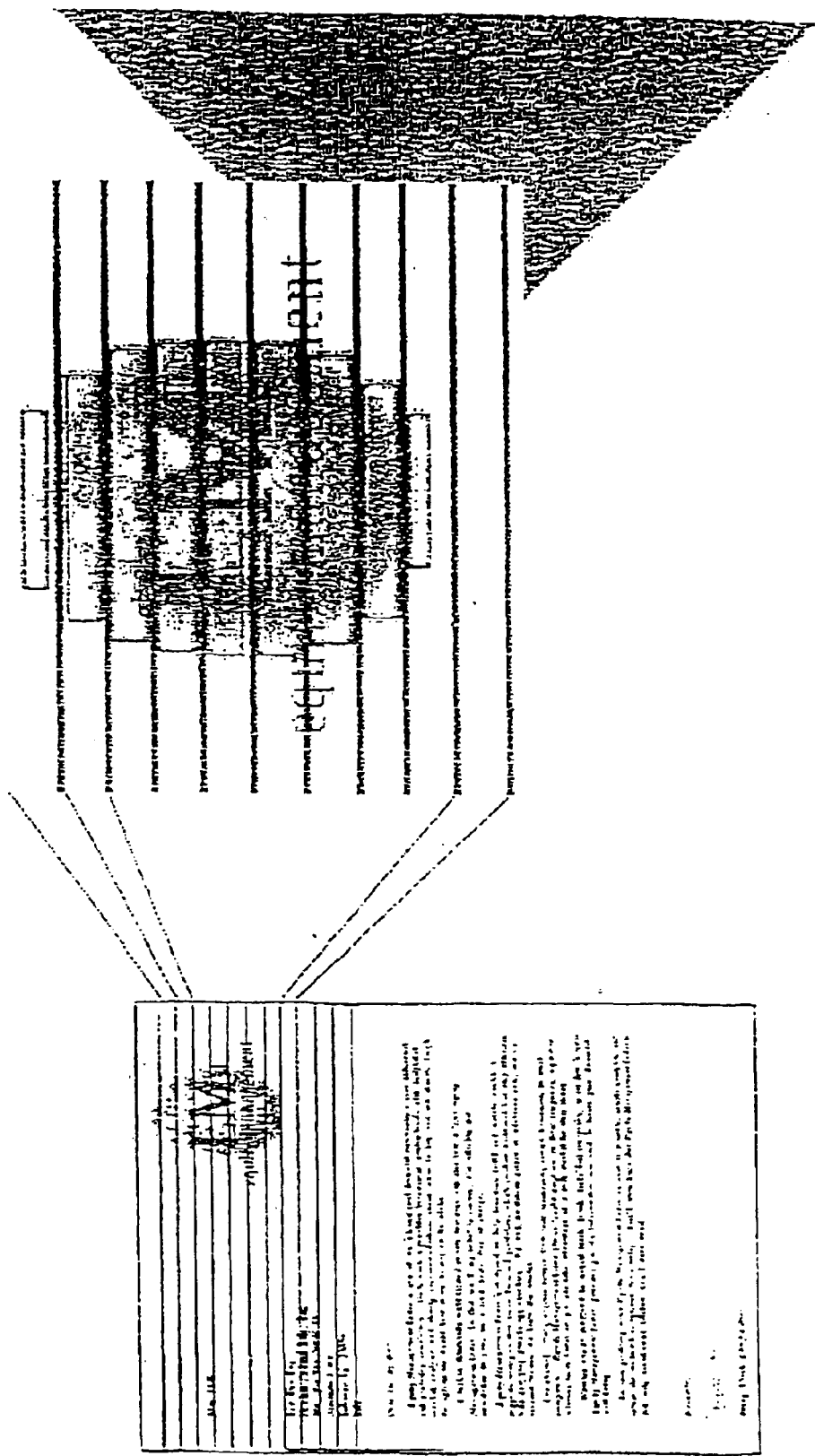
FIG. 14 shows a particular result for the atomic operation of FIGS. 13A, 13B and 13C.

The whole procedure that has been depicted can also be performed on a strip basis on the whole original image, without any modification, as shown in FIG. 13B. Strip based analysis produces a nice side effect on the grouping of pixels. In fact, if the grouping of pixels is performed on a strip basis, the grouping of pixels enables an approximation of the contour of colored regions, as shown in FIG. 14.

Figure 13C:
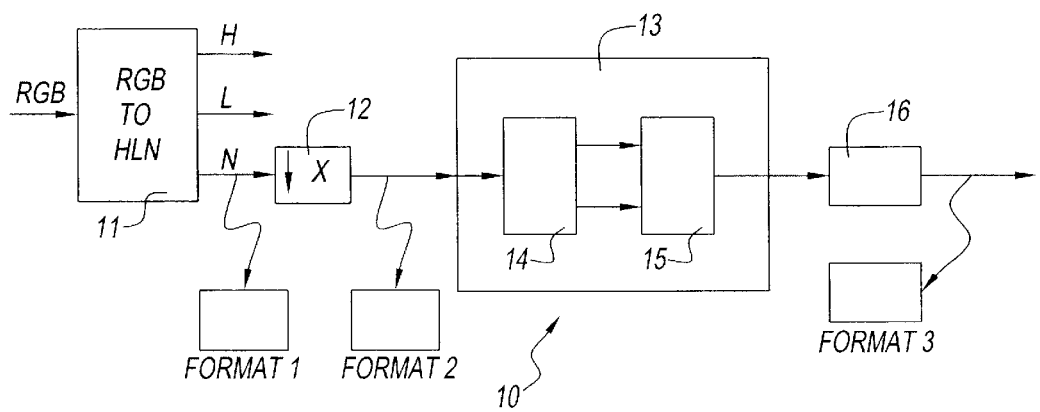

FIG. 13C shows a down sampling/thresholding/grouping device 10. The first component is an RGB to Chroma space converter 11. It converts, on a pixel by pixel basis, the color representation of every input pixel into a different color space representation.

When the aim is making decisions on the colorfulness of a pixel, using the right color space representation is important.

The RGB color space has been found not very convenient for this type of analysis. The color space used should have an indication of the colorfulness of the specific pixel. The HLN (Hue/Lightness/chroma indicator N) color space was found particularly convenient and is used in the current realization.

The indication of Chroma, in this HLN color space, is directly the content of the N channel, where N=max (R,G,B)−min (R,G,B).

The down sampling/thresholding/grouping device 10 further comprises a down sampler 12, that down samples the N channel, and a thresholding device 13, in turn comprising a threshold selector 14 and a look-up-table LUT 15 which apply a threshold to the down sampled data.

The output data is considered ON if colorfulness of the input image pixel is above the threshold and OFF if it is lower than the threshold.

Moreover, the color information of single small groups of pixels can be further grouped together by means of a grouping block 16, using known simple grouping techniques on data of connected components, in order to improve the compression of the image data and eliminate small groups of pixels that are still considered to be due to noise, or in any case, of insignificant size.

It should be noted that a HLS to RGB converter (not shown in FIG. 13C) can also be added to the down sampling/thresholding/grouping device 10 in order to obtain RGB output data.

Figure 15:
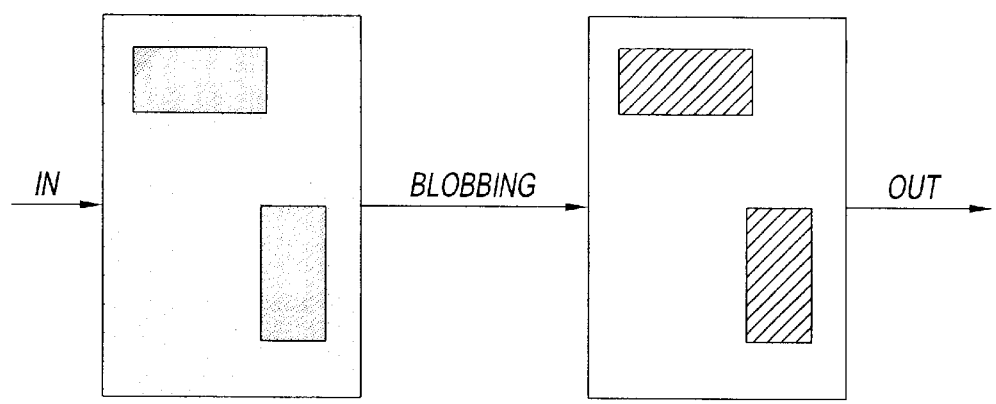
FIG. 15 shows another example of atomic operation used in the method according to the present invention.

A simple grouping procedure called blobbing can be used in order to extract the images from a document, as shown in FIG. 15, where the blobbed regions should correspond to the images of the document.

Figure 16:
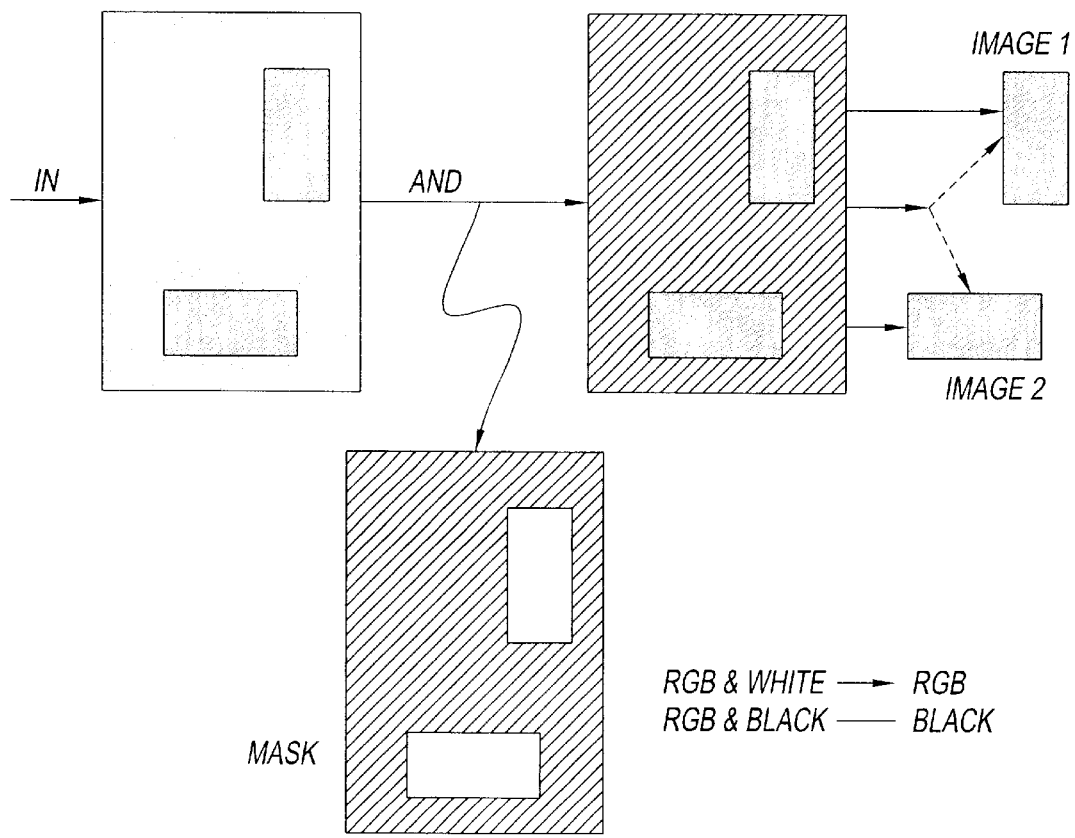
FIG. 16 shows another example of atomic operation used in the method according to the present invention.

Moreover, after the recognition of the colorfulness content of each pixel and the blobbing of the image data, the singular images in the processed document can be separated, as shown in FIG. 16, by means of an AND function of such data and a mask, duly created on the basis of the following relationships:

RGB AND WHITE=RGB

RGB AND BLACK=BLACK.

Figure 17:
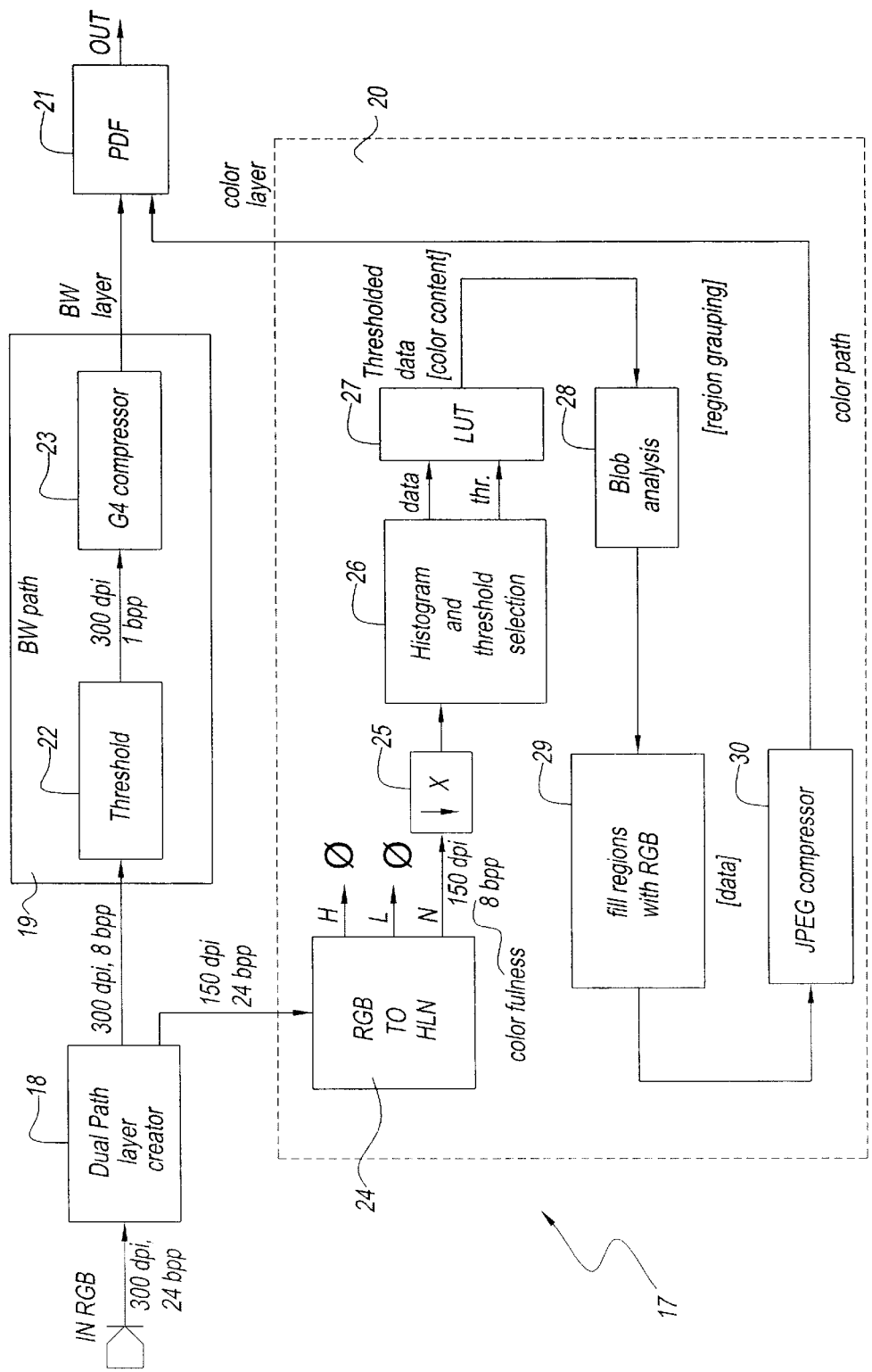
FIG. 17 shows more particularly a PDF application of the method according to the present invention.

A data processor 17 for obtaining processed color and BW layers is shown more precisely in FIG. 17. The processed color and BW layers so obtained can be used, for example, in a PDF representation of the input image data. Particularly, the data processor is a scanning device 17.

The scanning device 17 has an input IN that receives the raster image data, for example in the RGB format, and is connected to a dual path layer creator component 18, which in turn outputs a first and a second layer, such layers having different data compression rate.

The first layer is inputted in a BW path 19 that outputs a processed BW layer. In a similar manner, the second layer is inputted in a color path 20 that outputs a processed color layer. The processed BW and color layers are finally inputted in a PDF device 21.

More particularly, in the example shown in FIG. 17, the BW path 19 comprises a threshold block 22 connected in series to a compressor 23. A G4 compression is often used in the field of BW image data processing.

Moreover, also in FIG. 17, the color path 20 comprises a RGB to HLN converter 24, having the output N channel connected to a series of a down scale device 25, an histogram and threshold selector 26, a look-up-table 27, a blob analysis block 28, a fill regions block 29 and a compressor 30. A JPEG compression is often used in the field of color image data processing.

There are several advantages of the document analysis method using BW/color areas detection and scanning device according to the present invention:

1. Enables different representations of raster data be present together for different uses. An example is a 300 dpi G4 compressed BW layer that lies under a 150 dpi JPEG compressed color layer. The color layer is more pleasant to the eye but an OCR (Optical Characters Recognition) procedure could not be performed on the text in the JPEG layer. With this approach, the OCR may be applied to the BW data layer instead.

2. Enables a compromise between file size and use of the document itself. Taking into account the example above, a JPEG compressed 300 dpi page (which can be used for OCR) will result in about 600 Kbyte. A G4 compressed 300 dpi BW page will result in about 80 Kbyte but is lacking color information. If a 300 dpi BW layer is overlaid with a 150 dpi JPEG layer, then the resulting file size would be of about 250 Kbyte+80 Kbyte=330 Kbyte. The resulting document would have all the characteristics of the 600 dpi JPEG compressed version (OCR'able), but has half the file size.

3. In the case of selectively adding color information on the page, this approach has the advantages that, when an error is made by the algorithm and color was not added where it should have been, one always has a representation of the original data underneath (even if only BW data), and therefore no document content is lost.

4. The scanning device according to the present invention provides for an efficient way to produce this dual representation.

5. In a large series of cases, this approach achieve good compression ratios, without sacrificing the original information that is present in the document (for e.g. the extraction of text data for OCR). A layer can be added for preview, for example, without sacrificing size of the document.

6. The amount of data to process is highly reduced.

What is claimed is:

1. A document analysis method to detect BW and color areas comprising the following steps:

getting an input image data to be split into elementary unit of information;

analysing the input data to get a colorfulness indicator of each elementary unit of information of the input data, wherein the analysing step comprises the step of getting the input data into a Chroma space format;

assigning each elementary unit of information to either a BW layer or a color layer depending on the colorfulness indicator of said each elementary unit of information; and determining, in order to obtain a desired format for the output data, either to select or to combine the BW and color layers.

2. The document analysis method according to claim 1, further comprising the step of converting the input data from the RGB format to a Chroma space format.

3. The document analysis method according to claim 1, further comprising the step of down sampling a chroma indication channel.

4. The document analysis method according to claim 3, further comprising the step of applying a threshold or a rule for the colorfulness indicator to the down sampled data.

5. The document analysis method according to claim 4, further comprising the step of labeling ON the elementary information having a colorfulness above the threshold and OFF the elementary information having a colorfulness lower than the threshold.

6. The document analysis method according to claim 5, wherein the threshold value depends on the final device which receive the image data.

7. The document analysis method according to claim 6, wherein the BW elementary information are employed to assemble a first layer (TEXT) containing the portion of text comprised in the input data and the color elementary information are employed to assemble a second layer (IMAGE) containing the portion of image comprised in the input data.

8. The document analysis method according to claim 1, further comprising the step of down sampling the elementary units of said color layer.

9. The document analysis method of claim 8, wherein said step of downloading reduces a resolution of said color layer below a resolution of said BW layer.

10. A method for acquiring a document based on the analysis of the content of the document itself, comprising the following steps:
    getting an input image data;
    creating a first layer containing the image information in a color format;
    creating a second layer containing the image information in a BW format; and
    managing the first and the second layers in order to obtain a desired format for an output document, wherein the image information contained in the first layer has a first resolution lower than a second resolution of the image information contained in the second layer.

11. The method for acquiring a document as claimed in claim 10, wherein the sum of a size of the first layer of said first resolution plus a size of the second layer of said second resolution is lower than a size of said input mage data of said second resolution.

12. The method for acquiring a document as claimed in claim 10, wherein the second layer is used for managing text information.

13. The method of acquiring a document as claimed in claim 10, wherein said input image data comprised a first number of bits, said first layer comprises a second number of bits and said second layer comprises a-third number of bits, and wherein said second and third numbers are less than said first number.

14. The method of acquiring a document as claimed in claim 13, wherein said a sum of said second and third numbers is less than said first number.

* * * * *